Sept. 12, 1944.   G. T. SIMPSON   2,358,260
ATMOSPHERIC AIR FLOW REGULATOR
Filed April 15, 1941   2 Sheets-Sheet 1
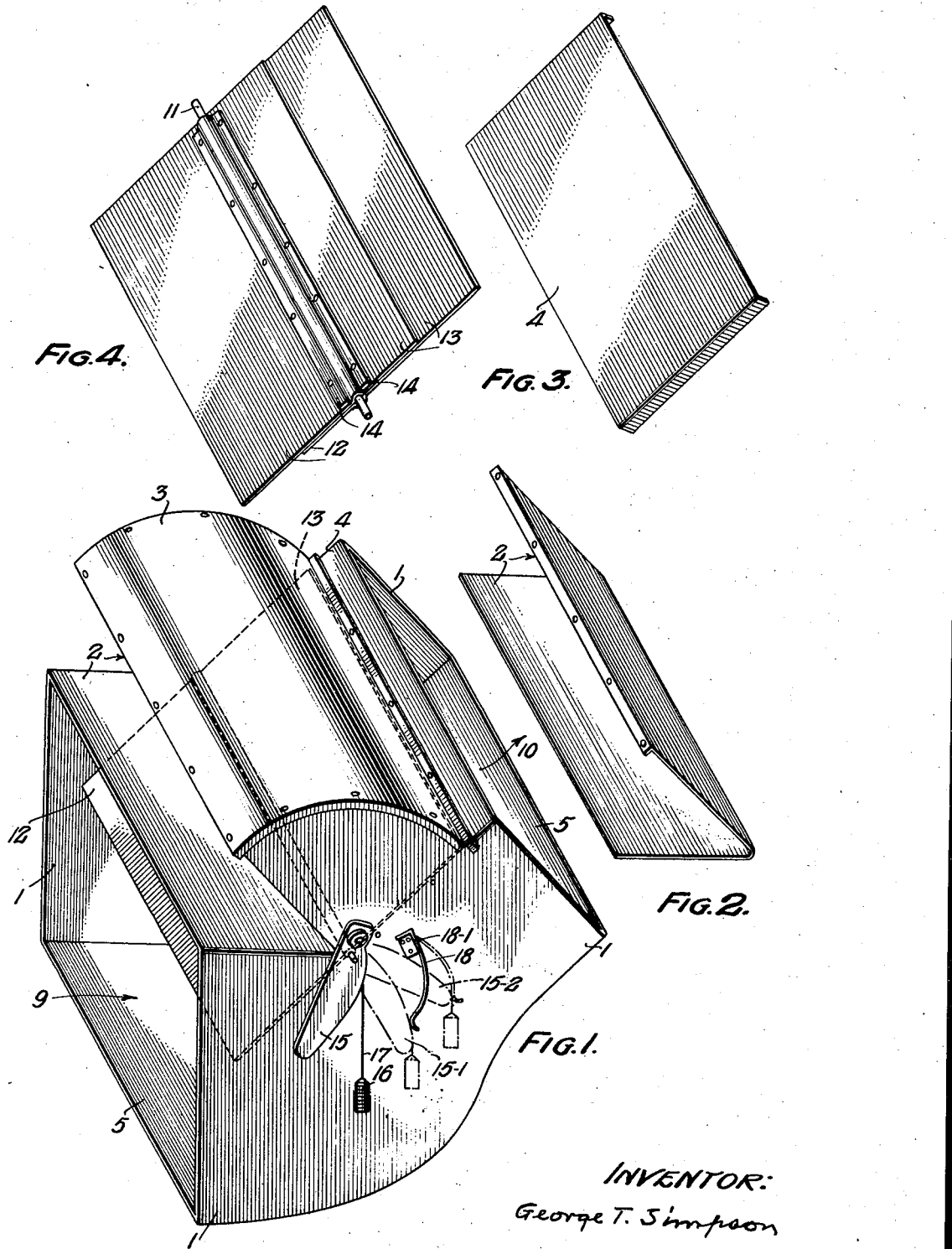
INVENTOR:
George T. Simpson Sept. 12, 1944.    G. T. SIMPSON    2,358,260
ATMOSPHERIC AIR FLOW REGULATOR
Filed April 15, 1941    2 Sheets-Sheet 2
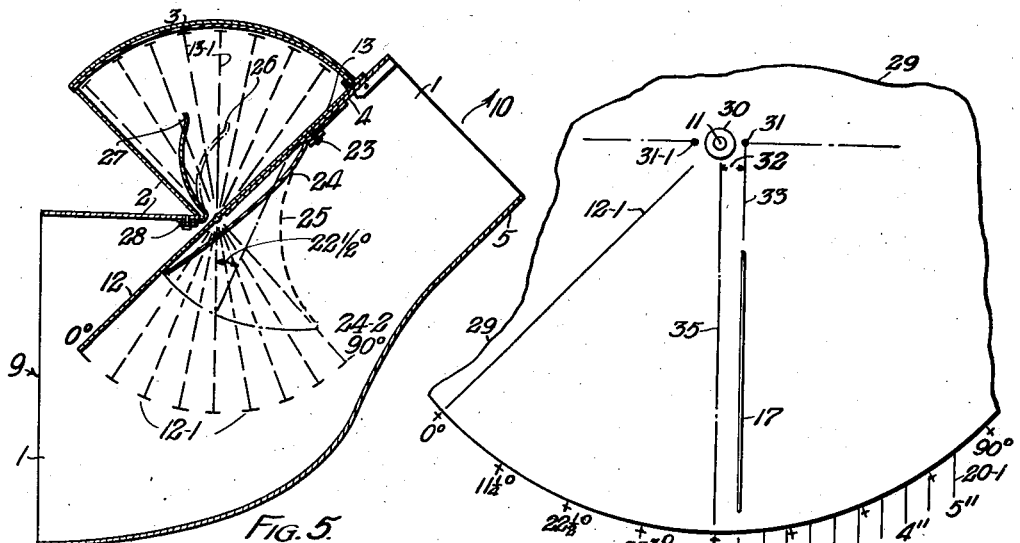
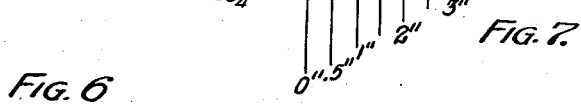
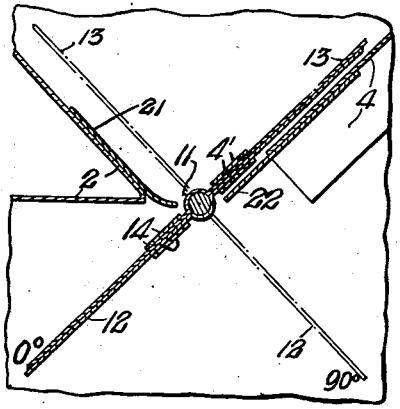
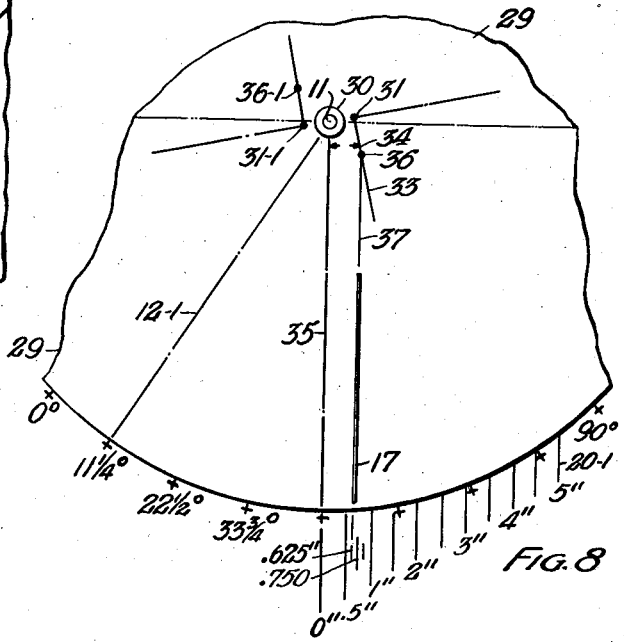
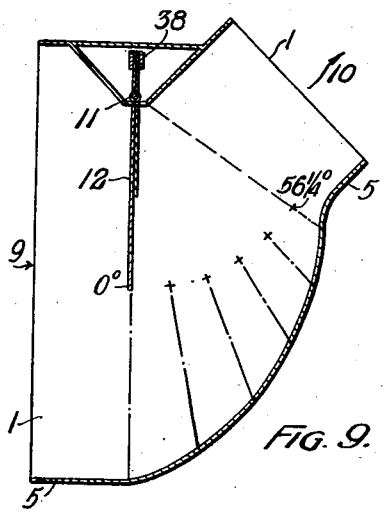
INVENTOR:
George T. Simpson Patented Sept. 12, 1944

2,358,260

UNITED STATES PATENT OFFICE 2,358,260

ATMOSPHERIC AIR FLOW REGULATOR

George T. Simpson, Detroit, Mich.

Application April 15, 1941, Serial No. 388,663
In Canada June 8, 1940

8 Claims. (Cl. 137—152)

My invention relates to improvements in atmospheric air flow regulators which function by the force due to the velocity of flowing air, as a windmill does, as distinguished from those regulators which function by the expansive force of a compressed fluid, as a steam engine does; and, specifically, to those regulators in which the damper has its axis at one of its edges. The objects of my improvements are, first, to minimize the loss of velocity in the air flowing through the regulator when the force of the air to be controlled is low; second, to provide a regulator designed to control the flow of air down to a delivered velocity as low as 200 feet per minute, or lower; third, to provide a design and method by which the dimensions of any size of regulator can be determined without resorting wholly to experimentation; fourth, to provide a much greater range of regulation than has hitherto been known; fifth, to provide a means by which the damper would be restrained from leaving its full open position until the desired quantity of air is passing through; sixth, to provide a means for minimizing the tendency of the damper to slam prematurely to its closed position; seventh, to provide a means for cushioning the oscillation of the damper when the force of the inflowing air fluctuates; eighth, to provide a regulator that can be adapted for use in almost any practical position.

I attain these objects by mechanism illustrated in the accompanying drawings, in which—

Figure 1 is an isometric view of the entire regulator as viewed with air entering the regulator horizontally from the left; Fig. 2, an isometric view of the angular shaped piece forming part of the regulator housing; Fig. 3, an isometric view of a separate piece used to form part of the retarder compartment and part of the rectangular outlet; Fig. 4, an isometric view of the counterbalancing combined damper and retarder, with shaft, which, when assembled in the housing, is mounted in suitable self-lubricating bearings formed on the walls 1, 1; Fig. 5 represents a vertical section of the regulator, a little to the near side of the middle, indicating the operation of the damper and retarder when a counterforce in the form of springs only is used in substitution for the weighted cam and auxiliary spring as shown in Fig. 1; Fig. 6 is an enlarged sectional view of the parts in the vicinity of the shaft 11 illustrating how the strips 21 and 22 partially close the space lengthwise with the shaft. Figs. 7 and 8 are enlarged views illustrating how the cam 15 is developed. And Fig. 9 represents a vertical section of an inferior form of regulator in which the damper hangs plumb when in its full open position, in a housing having a bottom wall that is shaped as an irregular curve.

The two side walls 1, 1 with the angular shaped piece 2, the 90 degree curved removable top 3, the piece 4, and the irregular curve shaped bottom wall 5, constitute the housing of the regulator; the upper part of the regulator, in the shape of a quadrant, is the compartment housing the retarder 13, and the lower part is the housing for the damper 12 and the air pasageway. The flowing air enters at the rectangular inlet 9 and leaves or is exhausted from the rectangular outlet 10 as indicated by the respective direction arrows. The top of the inlet lies in a plane horizontal to the axis and forms a 45 degree angle with the damper when the damper is in its fully open position. Thus an appropriate space is provided for favorable action on the front face of the damper by the air to be controlled. This inlet, as illustrated in Fig. 1, allows the inflowing air to strike the whole front face of the damper when in its fully open position and simultaneously to enter the initial restricted free area, in the same direction as the direction of flow of the inflowing air as indicated by the direction arrow at 9. The term "restricted free area" as used in this description refers to the opening formed by the tip or free edge of the damper, in its various positions as described hereafter, and the sides and bottom of the housing. This area becomes more and more restricted as the damper moves to the right towards its maximum flow restricting position as shown in Fig. 5.

A stiff and corrosion-resistant shaft 11, small in diameter, fits into the long hole formed in the light-weight, corrosion-resistant, laminated sheets constituting the counterbalancing combined damper 12 and retarder 13, and is held by binding strips 14, 14 which are drawn tight with screws, supplemented, if need be, by coating the shaft with pulverized rosin to give additional bite. The shaft is the axis of the damper 12 at its top edge as well as the axis of the retarder 13 at its bottom edge, and is so considered, notwithstanding that the top edge of the damper and the bottom edge of the retarder may be joined together as shown in Fig. 4 and no edge is apparent.

On one end of the shaft 11 and fastened to it is a light-weight, counterbalanced V-flanged, spirally shaped cam 15, from which is suspended a weight 16 by the flexible cable 17, and to the right is the cam's auxiliary spring 18 fastened to the side of the housing by the clamping bracket 18—1, and this cam, weight, cable and spring may be protected by being enclosed with a side cap. The position of the cam when the damper is partly closed is indicated at 15—1 and when closed is indicated at 15—2.

In Fig. 5, 12 represents the position of the damper when the damper is fully open. The broken lines 12—1 radiating downward from the axis, from 11¼ degrees to 90 degrees, represent the position of the damper in varying positions of closure 11¼ degrees apart; and, 13 and the broken lines 13—1 radiating upward from the axis represent corresponding positions of the retarder. Also indicated in Fig. 5 is the operation of the regulator when used with springs as the counterforce instead of the cam and auxiliary spring. Line 24 represents a long, slightly curved, flat spring fastened to the housing at 23 and the curving broken line 25 represents the position of this spring when the damper is in its closed position; the curving line 24—2 is the line upon which is measured the deflection and estimated power of the spring. The second and third springs 26 and 27 are located about as shown and placed one beside the other, but act in tandem, and are respectively clamped to the housing as indicated at 28.

When the damper is at maximum open position its free edge is directed toward the inlet, in which position the damper is at an angle of 45 degrees with an imaginary line from the axis of the damper to the bottom wall at right angles to the direction of flow of the inflowing air, the direction of flow being as indicated by the direction arrow at 9. In this position the damper is fully open. As the damper moves backward through an arc of 90 degrees it restricts the free area more and more. When it reaches 90 degrees it can move back no further. In this position it is in its maximum flow restricting position and is also considered as closed. However, preferably, the passageway is not entirely shut off. The distance of the opening remaining when the damper is in its maximum flow restricting position is, preferably, approximately ⅛ the distance of the opening when the damper is at its maximum open position, as indicated in Fig. 5. In some circumstances, the final distance can be more or less than the ⅛, or can be no distance, as may best suit the purpose to be served.

The dimensions and proportions of the regulator as illustrated in Fig. 1 and described in this specification are as follows: the initial restricted free area (defined in the next succeeding paragraph), the area of the damper 12, of the outlet 10, and of the retarder 13 are all the same, and the width of these areas is twice the depth or approximately so. On the basis of these dimensions and proportions the term "depth of the damper" is hereafter used as a unit of measurement.

The nominal capacity of a regulator is indicated by the area immediately below the free edge of the damper when the damper is in its full open position, referred to as the "initial restricted free area," the area of which is made equal in square feet to the desired capacity (quantity) in cubic feet of air per minute divided by the desired delivered velocity of the air in feet per minute. That is, $A$ equals $Q/V$. And, observing the preferred rule that the area be twice as wide as deep, the dimensions of this area can be calculated by making the depth (D) equal to the square root of ½ the area; that is, D equals the square root of ½A. However, the maximum fluid velocity to be provided for in a single regulator should not exceed, preferably, eight times the desired delivered velocity, on the basis of the clearance space, when the damper is in its maximum flow restricting position, being one-eighth of the initial restricted free area. For a greater range of velocity than would thus be provided for, two suitably devised regulators should be used in series.

The shape of the bottom 5 and the degree of reduction of the free area caused by the upward curve of the bottom, from the 0 degree position to the 90 degree position, is tentatively determined as follows: The distance between the free edge of the damper when in its maximum flow restricting position, as described above, and the bottom is selected. This distance is then subtracted from the distance between the free edge of the damper when fully open, as described above, and the bottom. The difference is the distance that has to be gradually reduced. The difference is divided by 8, the number of 11¼ degree divisions. This figure is then used as the constant difference to be subtracted in an arithmetical progression to reduce the distance gradually at each of the 8 division points.

However, to provide a bottom wall which is more symmetrical and better adapted to permit the flow of air at low velocity with a minimum loss of velocity, the bottom is actually formed by varying slightly from the ascertained respective distances described above. I use the ascertained respective distances as a guide in forming a compromising irregular curve of easier change for the bottom wall. The foregoing description provides a method whereby the dimensions of any size of housing and damper may be determined without resorting to experimentation, leaving only the varying value of the counterforce to be determined partially by experimentation.

Inferior forms of the housing can be designed to accommodate the damper positioned so that its free edge would be directed toward the inlet at an angle less than the preferred 45 degrees before mentioned when the damper is in its full open position, or to accommodate the damper swinging through an arc of less than the preferred 90 degrees shown in Figs. 1 and 5, or even to accommodate the damper positioned so that it is at right angles to the direction of flow of the inflowing air when in its full open position as illustrated in Fig. 9, by ascertaining the respective distances which should exist between the free edge of the damper and the bottom wall as before described, but, instead of the irregular curve having radii as illustrated in Fig. 1 the respective distance points would be connected together with an irregular curve of such curvature as would best suit the purpose as illustrated in Fig. 9. The irregular curve may be formed by using the conventional "irregular or French curves" used by draftsmen. An irregular curve comprises two or more regular curves of different radii. A regular curve is considered as being a segment of a perfect circle. The damper 12, hanging plumb, as shown in Fig. 9, does not necessarily have to be balanced under static conditions. It can be undercounterweighted as indicated at 38 in Fig. 9 or it need not be counterweighted because a counterforce means can be provided whether the damper is balanced under static conditions or under-counterweighted or not counterweighted. If the damper of an air flow regulator, such as is here described is counterweighted so that the damper is less than counterbalanced, i. e., undercounterweighted, the excess weight of the damper constitutes part of the counterforce mentioned in this specification.

This housing, with suitable bearings and a suitable counterforce, is adaptable for use in almost any practical position different from that illustrated in Fig. 1, including that of the housing being equivalently arranged so the axis of the damper may be vertical. However, any range of regulation of less than 30 degrees would, for various reasons, be so disadvantageous as to be impractical for general use.

Such a contracting bottom forms, in conjunction with the swing of the free edge of the damper, a free area which suitably reduces as the velocity of the air increases. Furthermore, such a reducing free area can be conveniently spaced— here at intervals of 11¼ degrees—for the purpose of making computations to determine the calculated velocities at each of the division points. This may be done by dividing the capacity of the regulator in cubic feet of air per minute by the area of the respective openings at the division points in square feet.

The damper is considered as being activated by the force due to the velocity of the incoming air striking the front face of the damper acting against the resisting counterforce of the weighted cam 15 and its auxiliary spring 18, even if the normal or natural pressure at the rear of the damper is diminished by suction at the outlet of the regulator. Beginning with the initial restricted free area, when the damper is in its fully open position, I calculate the velocity of the air to increase, at each of the respective 11¼ degree positions of the damper, in the same ratio as the corresponding free area decreases. (For example, the velocity is calculated to double if the free area is halved.) In other words, if the distance from the free edge of the damper, when in its initial or fully open position, to the bottom were 8 inches, and the width of the area were 16 inches, there would be 128 square inches or .889 square foot of free area. If the desired capacity (quantity) is 177.8 cubic feet of air per minute, I divide the 177.8 by .889 square foot and find the initial calculated velocity to be 200 feet per minute, using the formula $V$ equals $Q/A$. Then if at the second position of the damper, 11¼ degrees to the right, the height of the free area is reduced from the initial 8 inches to 7 inches, I multiply 7 by 16, the width, to get the area at that position—112 square inches or .78 of a square foot. This I divide into the 177.8 cubic feet and find the calculated velocity to be 228 feet per minute; and so on in like manner at each of the succeeding 11¼ degree divisions until the damper nears its closed position. However, to compensate for various factors of loss, there would have to be added to the calculated velocities a considerable varying percentage, ascertainable by experiment, to more nearly approximate the actual velocities: The velocities of the air, whether calculated or actual, are convertible into corresponding ounces of pressure per square inch, and, in turn, into inch-ounces of leverage of the damper on its axis. The calculated velocities are used when tentatively computing the varying value of the counterforce, but these values are later increased to conform to the actual velocities, as hereafter explained.

The damper is evenly counterbalanced, that is, balanced under static conditions, when it would, if supported by needle points at the exact center of each end of its shaft, remain stationary at any position in which it might be placed. In Figs. 1 and 4 the shaft is shown as being located horizontally, which shaft being supported, not by needle points, but by bearings around the outside of the small diameter shaft causes a slight static unbalance that is negligible; and the damper 12 is considered as being evenly counterbalanced by the retarder 13. The damper may be counterbalanced otherwise than by the retarder.

The arrangement whereby the free edge of the damper, when the damper is fully open, is directed toward the inlet at the beforementioned angle of 45 degrees importantly contributes to the low resistance of the air passageway from the inlet 9 to the outlet 10, as may be noticed in Fig. 5, and, especially when used with the irregular curve shaped bottom 5, adapts this regulator for use with velocities as low as 200 or less feet per minute.

Inferior results may be had by utilizing the statically balanced damper, when in its fully open position, with its free edge directed toward the inlet, as before described, in a housing having a rectangular, sloping or other practicably shaped bottom.

In the form of counterforce as illustrated in Fig. 1, the preferred leverage distance from the axis to the useful starting point of the curvature of the cam and the amount of weight attached thereto by the cable are made to be equal, as resisting counterforce, to the inch-ounces of leverage exerted by the air acting on the damper corresponding to the actual velocity of the air at which the desired volume of air passes when the damper is in its full open position, and thus holds the damper to its fully open position until the quantity of air passing nears or slightly exceeds the desired quantity. Then, as the force of the air increases, moving the damper toward its "closed" position, the cam, as it turns, pushes over the weighted cable to a lengthened horizontal distance from the axis, to such an extent as to constitute a resistance equal to the increased force of the air acting on the damper; thus there is equilibrium and the damper is held to the position due to such force; the increase in resisting counterforce is made to correspond reciprocally to any varying increase in the force of the air throughout the whole range of regulation, for about the first 56¼ degrees by the weighted cam only and thereafter with the auxiliary spring bearing on the cam. The cam as shown in Fig. 1 is abbreviated at its outer end, necessitating the use of an auxiliary spring; however, a cam could be devised which, with only the weight, would furnish the counterforce for the whole range of regulation, but I prefer the form as shown.

For the purpose of providing a means by which the dimensions of the cam and the value of its auxiliary spring may finally be determined, the inlet 9 is supplied with air of controllable velocity that is nearly equal in pressure over the whole area of the inlet 9, then a 45 degree angle fitting of long radius is connected to the outlet 10, to direct the flow of air horizontally, and to this fitting is connected a test duct of the same dimensions as the outlet 10, to equalize and straighten the flowing air; this duct should be in length ten times the mean dimensions of the outlet 10, and have in it an "egg crate" type of air straightener such as is prescribed in the "Standard Test Code" of the National Association of Fan Manufacturers as adopted by the American Society of Heating and Ventilating Engineers. At or near the end of this test duct readings are taken to indicate when the desired velocity of air is being "delivered."

To determine the value of counterforce to be furnished, I use, as in Figs. 7 and 8 a light weight balanced disc 29, the lower portion of which disc only is shown in Figs. 7 and 8; this disc has a radius equal to the "depth of the damper," is scored as at 12—1 to correspond with the position of the damper 12, has a hub 30 with a large flange on the other side of the disc, and is fastened to the shaft 11 as if it were the cam, and on this disc I tentatively locate the starting, first, station point 31 on the disc a horizontal distance 32 from the axis equal to, say, one-sixteenth the depth of the damper, or such other distance as may be necessary to provide for the desired initial velocity of air; for example, in Fig. 7 the distance is indicated as being .5"; and this distance when arithmetically multiplied by the amount of weight to be hung therefrom will constitute the resisting counterforce in inch-ounces at this station. At this station, 31, set in the disc a screw of small diameter and a balancing screw at 31—1. From this first station is hung, tentatively, sufficient weight on the cable 17 to equal the calculated inch-ounces of leverage exerted by the damper 12 on the axis when the desired velocity is supposedly being delivered by the regulator while the damper remains in its full open position at 0 degrees; after which the added and exact amount of weight required is determined upon, and used thereafter, by air velocity readings to be taken near or at the end of the test duct above mentioned. From this first station point score a plumb line 33 down a short distance on the disc. The second station point on the disc is found by increasing the supply of air to the inlet of the regulator so that the damper will move to its 11¼ degree position as in Fig. 8; then compute the inch-ounces of leverage exerted by the damper on the axis corresponding to the calculated increased velocity of the air at that position and divide those inch-ounces of leverage by the ounces of weight now on the cable, which will indicate the horizontal distance from the axis in inches or fractions at which the second station point should be tentatively located on the plumb line 33 in its changed, angular location, and this distance is measured horizontally from an unscored plumb line 35 down from the axis where a screw of small diameter is set in the disc as at 34; after which the actual location of the station point 36 is determined upon, on the plumb-line 33 from the first station, by air velocity readings to be taken near or at the end of the test duct before mentioned. For example, in Fig. 8 the actual station point 36 is shown as being a horizontal distance of .625" from the unscored plumb line 35; and, to suit the purpose, a scale of inches indicated at 20—1 is scored on the side of the regulator below the bottom of the scale: on this disc the readings are taken by observing the location thereon of the weighted cable 17. From the actual second station point 36 score a plumb-line 37 down a short distance on the disc, upon which the next succeeding station is to be located. Proceeding in like manner for as many of the degree divisions indicated in Figures 7 and 8 as may be necessary to answer the desired purpose. The station points having thus been determined, the screws are removed and the station points connected together by a perfect irregular (French) curve in one continuous unbroken line, and the curvature of the actual cam is made in accordance with this curve to the extent to which the cam is not abbreviated; and the spring 18 is designed to furnish the supplementing counterforce in accordance with the data ascertainable as above described.

The kind of counterforce illustrated in Fig. 1 is preferable if the most accurate regulation is required and if it is known in advance what position the regulator is to be used in. It is desirable to first make this form of counterforce in order to get the information from which to determine the modifications necessary to construct a counterforce such as the spring type illustrated in Fig. 5.

The spring type counterforce, consisting of the springs 24, 26, and 27, illustrated in Fig. 5, is a modification of that illustrated in Fig. 1 in that springs only are used and is preferred when only approximate regulation is needed because it can be used with the regulator in almost any practical position; the shaft of the damper-retarder can be either horizontal or vertical. The springs are designed to perform the same function, as nearly as possible, as the weighted cam with its auxiliary spring. The first spring 24 is estimated to furnish the same counterforce, as nearly as practicable, as the weighted cam does when the damper is at 0 degree position and at subsequent positions until the damper reaches a point midway between the 33¾ and 45 degree positions. When the damper is at this point, the second spring 26 begins to add to the counterforce. As the damper moves further towards the 90 degree position, the third spring 27 begins to add to the counterforce.

The counterbalancing retarder 13 rigidly attached to the damper 12 at the shaft 11 is oscillative in its compartment and functions as a "dash-pot," as ordinarily understood, for cushioning the movement of the damper. The compartment in which the retarder is located is tightly enclosed except along the shaft 11 where the opening is closed as much as is practicable by sheet metal strips 21 and 22 extending the whole width of the regulator, as indicated in Fig. 6. The enclosed compartment confines the air, with the result that the retarder, before it can move forward, has to compress the air in front of it sufficiently to force the air past the tip of the strip 21 and to rarefy the air behind it sufficiently to cause air to enter past the tip of the strip 22. It is restrained in its backward movement by the reverse of this action.

The retarder may, less preferably, be connected to the damper otherwise than as shown in the drawings.

Such a retarding means is adaptable not only to a regulator as illustrated in Fig. 1, but is adaptable to other forms of regulator in which a damper is activated by the force due to the velocity of natural flowing air.

The words air, air flow and such like expressions as used in the specifications are synonymous with fluid, fluid flow and such like expressions as used in the claims; and "activating air" means air flow whether acting as a pressure at the inlet of the regulator or as suction at the outlet of the regulator.

Having described and illustrated one form and two modifications of my invention, I wish it to be understood that my invention is not to be limited to the specific form or arrangement of parts herein described and shown, except in so far as such limitations are specified in the appended claims.

I claim:

1. A fluid flow regulator including a passage having an inlet at one end, an outlet at its other end and a pair of oppositely disposed walls one of which is curved gradually towards said opposite wall in a direction towards the outlet, a damper having a width substantially equal to the width of the passage pivoted adjacent said opposite wall and arranged to swing through an arc approaching ninety degrees toward said outlet by the force due to the velocity of the fluid entering said inlet, counterbalance means arranged to balance the damper under static conditions, counterforce means arranged to resist movement of the damper under flow conditions and maintain the damper with its free edge directed toward said inlet and forming with the inflowing air an angle approaching forty-five degrees under minimum fluid velocity conditions, the curvature of the wall and the counterforce means being so coordinated that the product of the area, formed between the free edge of the damper and the curved wall at fluid velocities in excess of the minimum, and the velocity producing such area is maintained substantially constant.

2. A fluid flow regulator including a passage having an inlet at one end, an outlet at its other end and a pair of oppositely disposed walls one of which approaches as an irrgular curve towards said opposite wall in a direction towards the outlet, a damper having a width substantially equal to the width of the passage pivoted adjacent said opposite wall and arranged to swing through any predetermined arc of not less than forty-five degrees and not exceeding approximately ninety degrees toward said outlet by the force due to the velocity of the fluid entering said inlet, counterbalance means arranged to balance the damper under static conditions, counterforce means arranged to resist movement of the damper under flow conditions and maintain the damper with its free edge directed toward said inlet and forming with an imaginary line from the axis of the damper to the curved wall at right angles to the direction of flow of the inflowing air any predetermined angle of not less than twenty-two and one half degrees and not exceeding approximately forty-five degrees under minimum fluid velocity conditions, the curvature of the wall and the counterforce means being so coordinated that the product of the area, formed between the free edge of the damper and the curved wall at fluid velocities in excess of the minimum, and the velocity producing such area is maintained substantially constant, all substantially as set forth.

3. In a fluid flow regulator of the class wherein the regulator includes a passage having an inlet at one end, an outlet at its other end and a pair of oppositely disposed walls one of which approaches towards said opposite wall in a direction towards the outlet, a damper having a width substantially equal to the width of the passage pivoted adjacent said opposite wall and arranged to swing toward said outlet by the force due to the velocity of the fluid entering said inlet, and counterforce means arranged to resist movement of the damper under flow conditions and maintain the damper in its full open position under minimum fluid velocity conditions, the combination of a damper arranged to swing through any predetermined arc of not less than forty-five degrees and not exceeding approximately ninety degrees towards said outlet, with a housing arranged to accommodate the said damper and having a pair of oppositely disposed walls one of which approaches towards its opposite wall in a direction towards said outlet as an irregular curve comprising two or more segments of a circle of different radii, the curvature of the wall and the said counterforce means being so coordinated that the product of the area, formed between the free edge of the damper and the curved wall at fluid velocities in excess of the minimum, and the velocity producing such area is maintained substantially constant, substantially as described.

4. A fluid flow regulator as described and claimed in claim 3, characterized by the regulator including also a counterweight means arranged to counterweight the damper.

5. In a fluid flow regulator of the class wherein the regulator includes a passage having an inlet at one end, an outlet at its other end and a pair of oppositely disposed walls one of which approaches towards said opposite wall in a direction towards the outlet, a damper having a width substantially equal to the width of the passage pivoted adjacent said opposite wall and arranged to swing toward said outlet by the force due to the velocity of the fluid entering said inlet, and a counterforce means arranged to resist movement of the damper under flow conditions so that the quantity of fluid flowing through the regulator remains substantially constant until the damper nears its closed position at fluid velocities in excess of the minimum, the combination with said damper of a counterbalance means arranged to balance the damper under static conditions and the damper arranged, in conjunction with said counterforce means, so that its free edge is directed toward the said inlet under minimum fluid velocity conditions and so that the damper may swing through any predetermined arc of not less than thirty degrees and not exceeding approximately ninety degrees toward said outlet at fluid velocities in excess of the minimum, substantially as described.

6. In a fluid flow regulator of the class wherein the regulator includes a passage having an inlet at one end, an outlet at its other end and a pair of oppositely disposed walls one of which approaches towards said opposite wall in a direction towards the outlet, a damper having a width substantially equal to the width of the passage pivoted adjacent said opposite wall and arranged to swing through any predetermined arc of not less than thirty degrees and not exceeding approximately ninety degrees toward said outlet by the force due to the velocity of the fluid entering said inlet, counterweight means arranged to counterweight the damper, and counterforce means arranged to resist movement of the damper under flow conditions so that the quantity of fluid flowing through the regulator remains substantially constant until the damper nears its closed position at fluid velocities in excess of the minimum, a housing arranged to provide a predetermined free area between the free edge of the damper and the said approaching wall when the damper is in its closed position of not less than one-sixteenth nor more than one-third of the free area between the free edge of the damper and the said wall when the damper is in its full open position, substantially as described.

7. In a fluid flow regulator of the class wherein the regulator includes a passage having an inlet at one end, an outlet at its other end and a pair of oppositely disposed walls one of which approaches towards said opposite wall in a direction towards the outlet, a damper having a width substantially equal to the width of the passage pivoted adjacent said opposite wall and arranged to swing toward said outlet by the force due to the velocity of the fluid entering said inlet, counterweight means arranged to counterweight the damper, and a counterforce means arranged to resist movement of the damper under flow conditions so that the quantity of fluid flowing through the regulator remains substantially constant until the damper nears its closed position at fluid velocities in excess of the minimum, the combination with said damper of an oscillative blade operatively attached to the damper, and a compartment to enclose the blade in its range of oscillation, said compartment having restricted openings for retarding the entrance and escape of air, whereby the movement of the damper would be cushioned when the damper is subject to fluctuations by the activating air, substantially as described.

8. A fluid flow regulator including a housing, an oscillative damper, a counterforce means integrated with said damper and so arranged to resist movement of the damper that the quantity of fluid flowing through the regulator remains substantially constant until the damper nears its closed position at fluid velocities in excess of the minimum, an oscillative blade operatively attached to the damper of said regulator, and a compartment to enclose the blade in its range of oscillation, said compartment having restricted openings for retarding the entrance and escape of air, so that the movement of the damper would be cushioned when the damper is subject to fluctuation by the activating air, substantially as described.

GEORGE T. SIMPSON.